(12) United States Patent
Khandekar

(10) Patent No.: US 8,135,026 B2
(45) Date of Patent: Mar. 13, 2012

(54) DISJOINT AND COMMON LINK OPERATION IN A WIRELESS COMMUNICATION SYSTEM

(75) Inventor: Aamod Khandekar, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 563 days.

(21) Appl. No.: 11/619,782

(22) Filed: Jan. 4, 2007

(65) Prior Publication Data

US 2007/0161389 A1   Jul. 12, 2007

Related U.S. Application Data

(60) Provisional application No. 60/756,931, filed on Jan. 5, 2006.

(51) Int. Cl.
*H04L 12/28* (2006.01)

(52) U.S. Cl. ........................................... 370/431

(58) Field of Classification Search ............ 455/517; 370/320, 322, 328, 329, 331, 335, 338, 342, 370/349, 350
See application file for complete search history.

(56) References Cited

U.S. PATENT DOCUMENTS

| | | | |
|---|---|---|---|
| 6,993,341 B2 | 1/2006 | Hunzinger | |
| 7,054,632 B2* | 5/2006 | Attar et al. | 455/436 |
| 7,096,039 B2* | 8/2006 | Chuah et al. | 455/561 |
| 7,292,856 B2* | 11/2007 | Julian et al. | 455/436 |
| 2002/0196752 A1 | 12/2002 | Attar et al. | |
| 2003/0054812 A1* | 3/2003 | Hunzinger | 455/423 |
| 2004/0037291 A1 | 2/2004 | Attar et al. | |
| 2005/0085265 A1* | 4/2005 | Laroia et al. | 455/560 |
| 2006/0135152 A1 | 6/2006 | Kirkpatrick | |
| 2006/0268783 A1* | 11/2006 | Julian et al. | 370/331 |
| 2008/0009292 A1* | 1/2008 | Julian et al. | 455/440 |

FOREIGN PATENT DOCUMENTS

| | | |
|---|---|---|
| JP | 6508492 T | 9/1994 |
| JP | 2003179958 A | 6/2003 |
| JP | 2005500767 | 1/2005 |
| KR | 20010013849 A | 2/2001 |
| KR | 1020020085856 | 11/2002 |
| KR | 20050021618 A | 3/2005 |

(Continued)

OTHER PUBLICATIONS

International Search Report—PCT/US07/060186, International Search Authority—European Patent Office—Dec. 11, 2007.

(Continued)

*Primary Examiner* — Kwang B Yao
*Assistant Examiner* — Jung-Jen Liu
(74) *Attorney, Agent, or Firm* — Dmitry R. Milikovsky; Darren M. Simon

(57) ABSTRACT

Techniques for supporting communication with disjoint links and common links are described. A sector may broadcast an overhead message and/or send unicast messages to indicate whether the sector supports disjoint links. A terminal may receive at least one message indicating whether disjoint links are supported by at least one sector. When disjoint links are supported, a forward link (FL) serving sector and a reverse link (RL) serving sector may be independently selected for the terminal. When disjoint links are not supported, a single sector may be selected as both the FL and RL serving sectors for the terminal. Handoff of the terminal may be performed independently for the forward and reverse links if disjoint links are supported and may be performed jointly if disjoint links are not supported.

12 Claims, 7 Drawing Sheets

FOREIGN PATENT DOCUMENTS

| | | |
|---|---|---|
| RU | 2237379 C2 | 9/2004 |
| TW | 300943 | 3/1997 |
| WO | WO9319537 A1 | 9/1993 |
| WO | WO03017713 | 2/2003 |
| WO | WO03103326 A1 | 12/2003 |
| WO | WO 2004/064294 | 7/2004 |
| WO | WO2004068739 A1 | 8/2004 |
| WO | WO2005079006 A1 | 8/2005 |
| WO | WO 2005/125253 | 12/2005 |
| WO | 2006121864 | 11/2006 |

OTHER PUBLICATIONS

Written Opinion—PCT/US2007/060186, International Search Authority—European Patent Office—Dec. 11, 2007.
Taiwan Search Report—TW096100618—Tipo—Mar. 16, 2011.

* cited by examiner

DISJOINT AND COMMON LINK OPERATION IN A WIRELESS COMMUNICATION SYSTEM

CLAIM OF PRIORITY UNDER 35 U.S.C. §119

The present application claims priority to provisional U.S. Application Ser. No. 60/756,931, entitled "SYSTEMS AND METHODS FOR DISJOINT LINK OPERATION," filed Jan. 5, 2006, assigned to the assignee hereof and incorporated herein by reference.

BACKGROUND

I. Field

The present disclosure relates generally to communication, and more specifically to techniques for supporting communication in a wireless communication system.

II. Background

Wireless communication systems are widely deployed to provide various communication services such as voice, video, packet data, broadcast, messaging, etc. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal OFDM (OFDMA) systems, Single-Carrier FDMA (SC-FDMA) systems, etc.

In a wireless communication system, a terminal may communicate with one or more base stations via transmissions on the forward and reverse links. The forward link (or downlink) refers to the communication link from the base stations to the terminals, and the reverse link (or uplink) refers to the communication link from the terminals to the base stations. At any given moment, the terminal may send a transmission on the reverse link to one or more base stations and/or may receive a transmission on the forward link from one or more base stations. It is desirable to select appropriate base station(s) to serve the terminal on the forward and reverse links in order to improve performance.

SUMMARY

Techniques for supporting communication with disjoint links and common links (or non-disjoint links) are described herein. When disjoint links are supported, a forward link (FL) serving sector and a reverse link (RL) serving sector may be independently selected for a terminal. When disjoint links are not supported, a single sector is selected as both the FL and RL serving sectors for the terminal. A serving sector for a given link is a sector selected to serve the terminal for that link.

In an aspect, a sector may support disjoint links or common links, which may be statically determined based on system configuration or dynamically selected during system operation. The sector may broadcast an overhead message (e.g., a mode bit) that indicates whether the sector supports disjoint links. Terminals within the coverage of the sector can receive the overhead message and generate information indicative of whether the sector supports disjoint links. Alternatively or additionally, the sector may convey whether it supports disjoint links via unicast messages sent to specific terminals.

In another aspect, a terminal operates based on whether disjoint links or common links are supported by candidate sectors that may serve the terminal. The terminal may receive messages indicating whether disjoint links are supported by the candidate sectors. At least one serving sector may be selected for the terminal for the forward and reverse links based on whether disjoint links are supported. An FL serving sector and an RL serving sector may be independently selected for the terminal if disjoint links are supported. A single serving sector may be selected for both links if disjoint links are not supported. Handoff may also be performed based on whether disjoint links are supported. For example, handoff of the terminal may be performed independently for the forward and reverse links if disjoint links are supported and may be performed jointly if disjoint links are not supported.

Various aspects and features of the disclosure are described in further detail below.

DETAILED DESCRIPTION

The techniques described herein may be used for various communication systems such as CDMA, TDMA, FDMA, OFDMA, and SC-FDMA systems. The terms "system" and "network" are often used interchangeably. A CDMA system may implement a radio technology such as Wideband-CDMA (W-CDMA), cdma2000, etc. cdma2000 covers IS-2000, IS-856 and IS-95 standards. A TDMA system may implement a radio technology such as Global System for Mobile Communications (GSM), Digital Advanced Mobile Phone System (D-AMPS), etc. These various radio technologies and standards are known in the art. An OFDMA system utilizes Orthogonal Frequency Division Multiplexing (OFDM). An SC-FDMA system utilizes Single-Carrier Frequency Division Multiplexing (SC-FDM). OFDM and SC-FDM partition the system bandwidth into multiple orthogonal subcarriers, which are also referred to as tones, bins, etc. Each subcarrier may be modulated with data. In general, modulation symbols are sent in the frequency domain with OFDM and in the time domain with SC-FDM.

Figure 1:
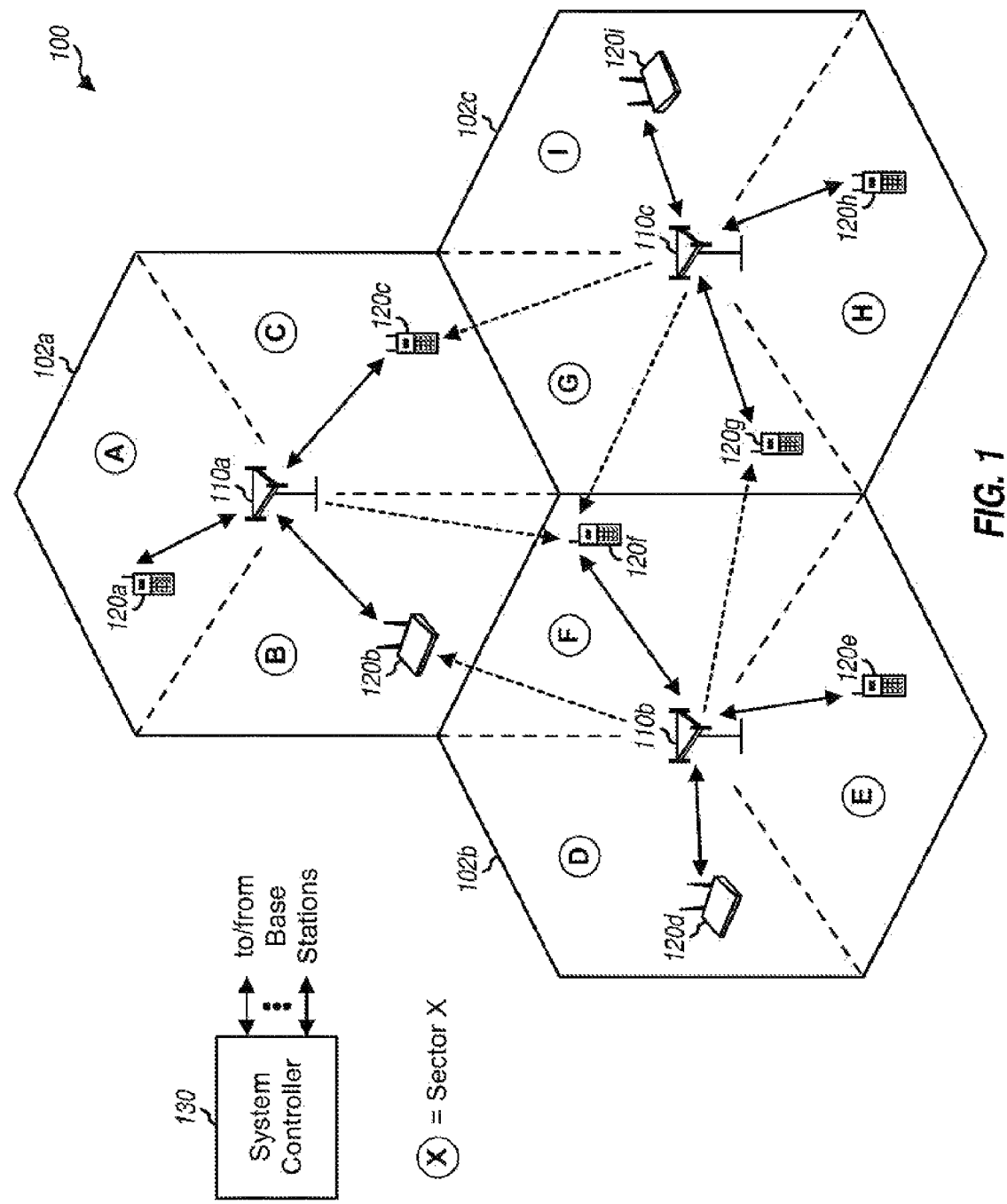
FIG. 1 shows a wireless communication system.

FIG. 1 shows a wireless communication system 100 with multiple base stations and multiple terminals. For simplicity, only three base stations 110*a*, 110*b* and 110*c* and nine terminals 120*a* through 120*i* are shown in FIG. 1. A base station is a station that communicates with the terminals. A base station may also be called, and may contain some or all of the functionality of, an access point, a Node B, an enhanced Node B, etc. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

In the example shown in FIG. 1, base station 110a provides communication coverage for three sectors A, B and C. Base station 110b provides communication coverage for three sectors D, E and F. Base station 110c provides communication coverage for three sectors G, H and I.

For a centralized architecture, a system controller 130 couples to base stations 110 and provides coordination and control for these base stations. System controller 130 may be a single network entity or a collection of network entities. For a distributed architecture, the base stations may communicate with one another as needed.

Terminals 120 may be dispersed throughout the system, and each terminal may be stationary or mobile. A terminal may also be called, and may contain some or all of the functionality of, an access terminal, a mobile station, a user equipment, a subscriber station, a station, etc. A terminal may be a cellular phone, a wireless device, a personal digital assistant (PDA), a wireless modem, a handheld device, etc.

A terminal may receive a transmission on the forward link (FL) from a sector, which is called an FL serving sector. The terminal may also send a transmission on the reverse link (RL) to a sector, which is called an RL serving sector. The FL serving sector may be selected by the terminal or the system based on received signal strength, received signal quality, and/or other measurements made by the terminal for different sectors. The RL serving sector may be selected by the terminal or the system based on received signal strength, received signal quality, and/or other measurements made by different sectors for the terminal. If one entity makes measurements for a given link and another entity selects the serving sector for that link, then the entity making the measurements may send information (e.g., for signal strength, signal quality, interference level, etc.) to the entity selecting the serving sector. In general, the FL serving sector may or may not be the RL serving sector. The FL and RL serving sectors may be the last sectors from which the terminal successfully received FL and RL assignments, respectively. These sectors may continue to be the serving sectors for the terminal until new FL and/or RL assignments are received from other sectors.

A terminal, or a sector, may communicate using disjoint links or common links. Disjoint links refer to a scenario in which an FL serving sector and an RL serving sector may be selected independently for the terminal. With disjoint links, a single sector or two different sectors can serve the terminal on the forward and reverse links. Common links (or non-disjoint links) refer to a scenario in which a single sector is both the FL serving sector and the RL serving sector for the terminal. With common links, the FL and RL serving sectors are selected jointly.

FIG. 1 shows communication with common links. Each terminal communicates with a single serving sector for both the forward and reverse links, which is indicated by a solid line with double arrows. For example, terminal 120a communicates with sector A, terminal 120b communicates with sector B, terminal 120c communicates with sector C, etc. A terminal may also receive pilot and/or signaling from a non-serving sector, which is shown by a dashed line with a single arrow. For example, terminal 120b may receive pilot and/or signaling from non-serving sector F, terminal 120f may receive pilot and/or signaling from non-serving sectors B and G, etc.

With common links, a terminal may have a single active set for both the forward and reverse links. An active set is a set of sectors that may be selected based on any criterion. An active set may also be referred to as a candidate set, a sector set, etc. An active set may contain the serving sector as well as candidate sectors to which the terminal may be handed off. An active set may also contain sectors that have assigned the terminal certain resources, e.g., a Medium Access Control identifier (MAC ID), a terminal ID, radio and/or time resources, etc. An active set may also contain sectors of sufficient signal strength or quality, e.g., as measured by the terminal and/or sectors. An active set may also contain sectors determined in other manners. In the example shown in FIG. 1, the active set for terminal 120b may include sectors B and F, the active set for terminal 120f may include sectors B, F and G, etc. Sectors may be added to or removed from an active set based on signal strength, signal quality, and/or other measurements, which may be made by a terminal and/or the sectors. The active set may facilitate handoff of the terminal between different sectors of the same cell or different cells. Handoff may be performed to maintain communication, to improve performance, to manage capacity, etc.

Figure 2:
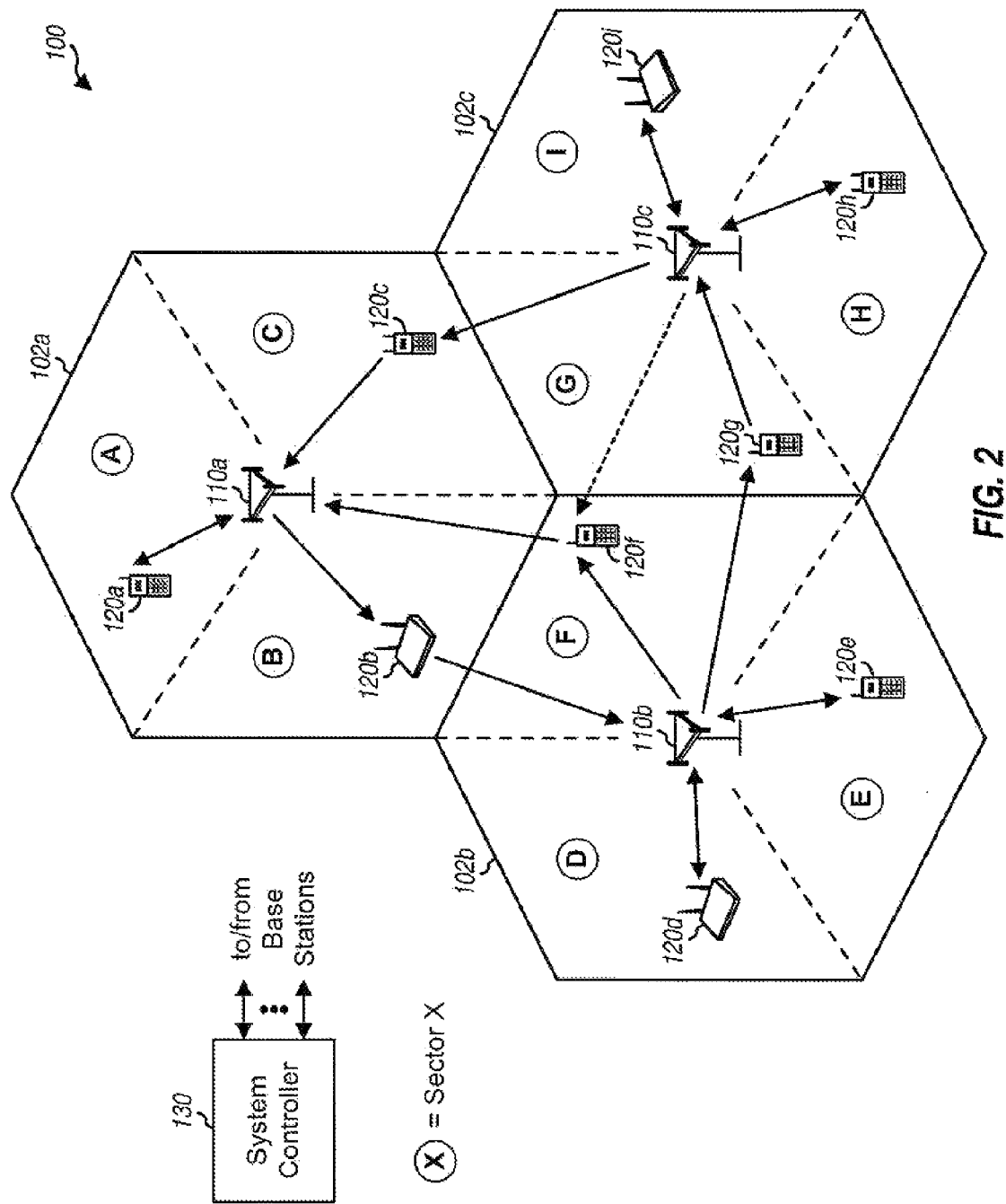
FIG. 2 shows communication with disjoint links and common links.

FIG. 2 shows communication with disjoint links and common links. In this example, terminals 120b, 120c, 120f and 120g operate with disjoint links and terminals 120a, 120d, 120e, 120h and 120i operate with common links. For each terminal with disjoint links, the FL serving sector is indicated by a solid line with a single arrow pointing at the terminal, and the RL serving sector is indicated by a solid line with a single arrow pointing at the sector. For example, terminal 120b has sector B as the FL serving sector and sector F as the RL serving sector, terminal 120c has sector G as the FL serving sector and sector C as the RL serving sector, etc.

With disjoint links, a terminal may have separate active sets for the forward and reverse links. The active set for each link may contain the serving sector for that link as well as candidate sectors to which the terminal may be handed off for that link. Sectors may be added to or removed from the active set for each link based on signal strength/quality measurements for that link. Alternatively, a single active set may be maintained for both the forward and reverse links even for disjoint links. For both disjoint links and common links, the sectors in an active set may be members of one or more synchronous subsets. Each synchronous subset may contain one or more sectors with the same timing. Different synchronous subsets may have different timing, e.g., are synchronized by different sources.

It may be advantageous to support disjoint links. For example, the system may utilize frequency division duplexing (FDD) for communication between the sectors and the terminals. With FDD, two separate frequency channels are used for the forward and reverse links, and the channel conditions for the forward link may not correlate well with the channel conditions for the reverse link. The system may also utilize time division duplexing (TDD) for communication between the sectors and the terminals. With TDD, a single frequency channel is used for both the forward and reverse links, which may experience similar channel responses. However, interference conditions may be different on the forward and reverse links. Furthermore, different sectors may have different antenna gains or power amplifier sizes, which may result in imbalance between the forward and reverse links. For both FDD and TDD, disjoint links would allow for selection of (a) a sector with the best forward link channel conditions for a terminal as an FL serving sector and (b) a sector with the best reverse link channel conditions for the terminal as an RL serving sector.

However, in some situations, it may be appropriate to have common links. This may be the case, for example, if the system utilizes TDD and interference conditions are similar on the forward and reverse links. A single sector may observe the best forward and reverse link channel conditions for a terminal and may efficiently serve the terminal for both links. Common links may also be useful in an FDD system when a sector does not have sufficient capacity to transmit information about reverse link channel quality to a terminal. In this case, the terminal will not have relevant information about the reverse link and may not be able to select an appropriate RL serving sector.

In an aspect, a sector may support disjoint links and/or common links, on a static or dynamic basis. The sector may operate in either a disjoint links allowed mode or a disjoint links disallowed mode, which may also be referred to as a common links mode or a non-disjoint links mode. In the disjoint links allowed mode, both disjoint links and common links are supported, and the sector may be selected as an FL serving sector, or an RL serving sector, or both the FL and RL serving sectors for a terminal. In the disjoint links disallowed mode, only common links are supported and disjoint links are not allowed. In this mode, the sector may be selected as a serving sector for a terminal and would then be both the FL and RL serving sectors for that terminal. The terminal is thus forced to have the same serving sector for both the forward and reverse links in this mode.

A sector may operate in one of the two modes based on various factors. For example, the sector may support disjoint links if the system utilizes FDD and may not support disjoint links if the system utilizes TDD. A terminal may be capable of operating in both FDD and TDD systems, and these two types of systems may set the mode bit separately. A sector may also disallow disjoint links if there is insufficient capacity to transmit information about reverse link channel quality, if the RL pilot is insufficient to measure RL quality, etc. In general, an appropriate mode may be selected for the sector based on the system configuration, the sector capability and capacity, and/or other factors. The mode supported by the sector may be statically determined based on system configuration or may be dynamically selected during system operation.

A sector may operate in either of the two modes for all terminals within the coverage of the sector. The sector may also operate in different modes for different terminals. For example, some terminals may support disjoint links while other terminals may not support disjoint links. A terminal's capability to support disjoint links may be determined based on a message sent by the terminal, the terminal ID, the terminal type, a database containing information regarding the capabilities of terminals, etc.

A sector may convey its supported mode in various manners. In one design, the sector broadcasts a mode bit that indicates its supported mode. For example, the mode bit may be set to '1' to indicate that disjoint links are supported and set to '0' to indicate that disjoint links are not supported. The mode bit may be part of an overhead message or signaling sent on an overhead channel and may be sent periodically. Terminals within the coverage of the sector can receive the mode bit and generate information indicative of whether the sector supports disjoint links.

In another design, a sector conveys its supported mode in unicast messages sent to specific terminals. For example, a message to update an active set for a terminal may include (a) a separate bit for each sector in the active set to indicate whether that sector supports disjoint links or (b) a single bit for all sectors in the active set to indicate whether these sectors support disjoint links. For example, sector A in the active set may support disjoint links while sector B may not support disjoint links. As another example, a single bit may indicate that all sectors in the active set do or do not support disjoint links. The unicast messages allow the sector to support different modes for different terminals and to convey the supported mode to specific terminals.

In one design, the mode for each sector may be independently selected. In this design, neighboring sectors may independently broadcast their mode bits. In another design, neighboring sectors operate in the same mode, which may be determined by the system. In this design, neighboring sectors may broadcast the same mode bit.

The system may support hard handoff, soft handoff, or softer handoff. Hard handoff refers to transfer of a terminal from a first sector to a second sector where a connection to the first sector is broken before or at the same time as a connection to the second sector is made. Soft handoff refers to transfer of a terminal from a first sector in one cell to a second sector in another cell where a connection to the second sector is made before a connection to the first sector is broken. Softer handoff refers to transfer of a terminal from a first sector in a cell to a second sector in the same cell where a connection to the second sector is made before a connection to the first sector is broken. An active set for a terminal may be different depending on whether the system supports hard, soft, or softer handoff. In the following description, "handoff" can refer to hard handoff, soft handoff, or softer handoff.

Handoff (whether hard, soft, or softer) of a terminal to a sector may be performed based on the mode supported by the affected sectors. The best FL sector and the best RL sector for the terminal may be determined based on received signal strength, received signal quality, etc. If the current FL serving sector is not the best FL sector, then FL handoff may be performed to the best FL sector if allowed by the mode of the affected sectors. Similarly, if the current RL serving sector is not the best RL sector, then RL handoff may be performed to the best RL sector if allowed by the mode of the affected sectors. The decision to perform FL handoff and/or RL handoff may be based on various factors such as the channel conditions for different sectors, sector capacity, etc.

Table 1 gives one example design of performing handoff for a terminal. If FL handoff is performed and the best FL sector does not support disjoint links, then RL handoff to the best FL sector is also performed. Similarly, if RL handoff is performed and the best RL sector does not support disjoint links, then FL handoff to the best RL sector is also performed.

TABLE 1

| | Best RL sector supports disjoint links | Best RL sector does not support disjoint links |
|---|---|---|
| Best FL sector supports disjoint links | Handoff to the best FL sector for the forward link and to the best RL sector for the reverse link | Handoff to the best RL sector for both the forward and reverse links |
| Best FL sector does not support disjoint links | Handoff to the best FL sector for both the forward and reverse links | Handoff to the best FL or RL sector for both the forward and reverse links |

Handoff may also be performed in other manners based on other handoff rules and logics. For example, if a target FL serving sector does not support disjoint links, then an FL handoff request may automatically be interpreted as an RL handoff request as well.

Figure 3:
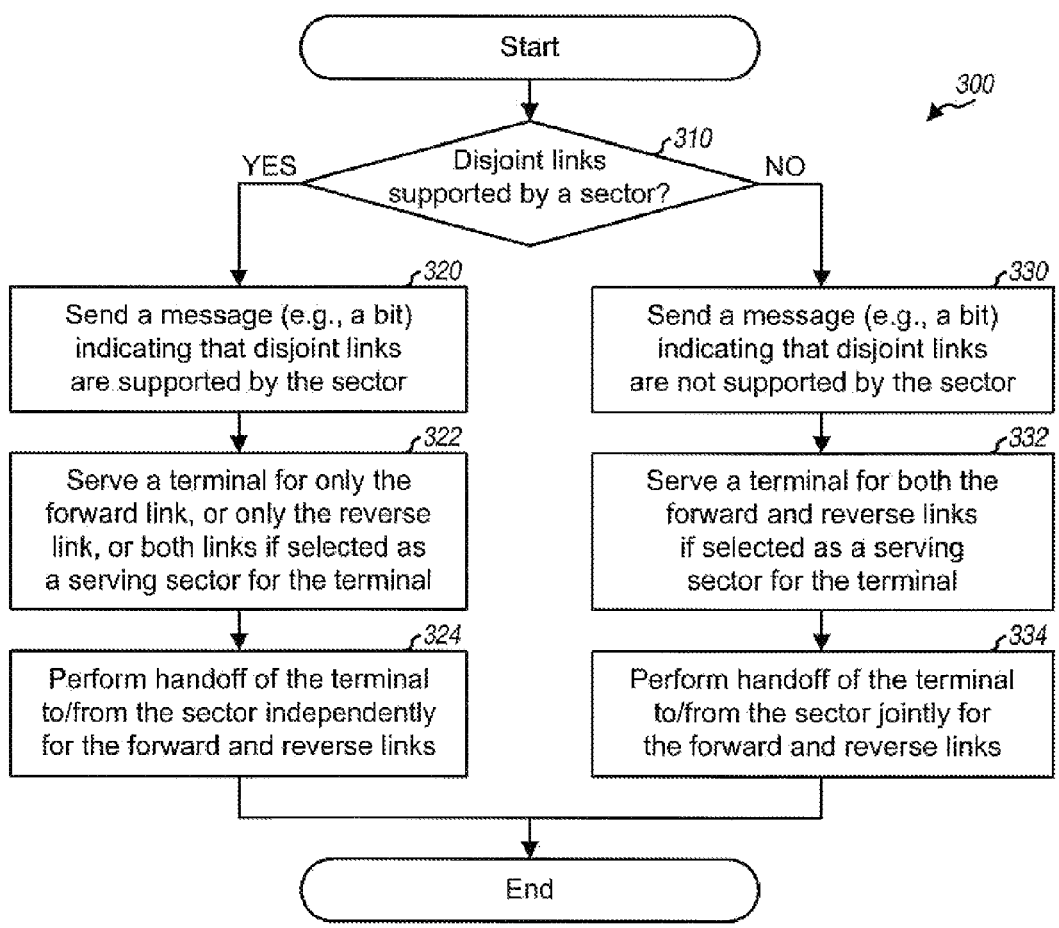
FIG. 3 shows a process performed by a sector to support communication.

FIG. 3 shows a process 300 performed by a sector to support communication. The sector may be the current serving sector for a terminal, a sector to which the terminal is attempting to register or enter communication, etc. Initially, a determination is made whether the sector supports disjoint links for communication (block 310). This determination may be based on (a) a preset/fixed parameter determined at system configuration or (b) a configurable parameter that may be dynamically selected during system operation. Alternatively, this information may be predetermined and read based upon functional parameters or the like.

If the answer is 'Yes' for block 310, then a message indicating that disjoint links are supported by the sector is sent (block 320). This message may be an overhead message, a unicast message, a multicast message, or an implicit message that is not actually sent. The sector may serve a terminal for only the forward link, or only the reverse link, or both links if selected as a serving sector for the terminal (block 322). Handoff of the terminal to/from the sector may be performed independently for the forward and reverse links (block 324).

Otherwise, if the answer is 'No' for block 310, then a message indicating that disjoint links are not supported by the sector is sent (block 330). The sector may serve a terminal for both the forward and reverse links if selected as a serving sector for the terminal (block 332). Handoff of the terminal to/from the sector may be performed jointly for the forward and reverse links, so that handoff for both links will be linked (block 334).

For blocks 320 and 330, the sector may convey whether disjoint links are supported to (a) all terminals via a broadcast message, (b) a specific terminal via a unicast message, or (c) a group of terminals via a multicast message. The sector may also convey this information in other manners using other signaling mechanisms.

Figure 4:
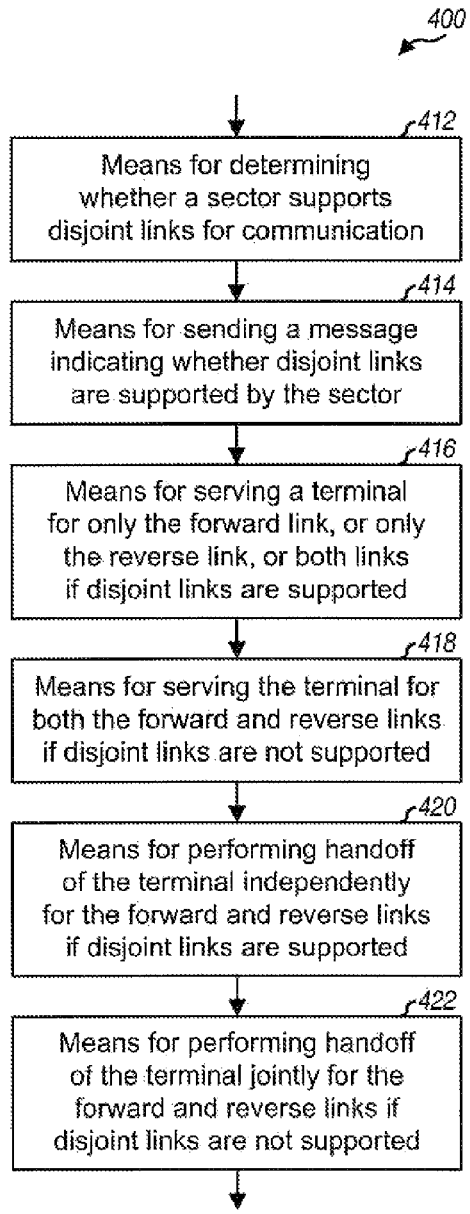
FIG. 4 shows an apparatus for supporting communication by a sector.

FIG. 4 shows an apparatus 400 for supporting communication by a sector. Apparatus 400 includes means for determining whether the sector supports disjoint links for communication (block 412), means for sending a message indicating whether disjoint links are supported (block 414), means for serving a terminal for only the forward link, or only the reverse link, or both links if disjoint links are supported (block 416), means for serving the terminal for both the forward and reverse links if disjoint links are not supported (block 418), means for performing handoff of the terminal independently for the forward and reverse links if disjoint links are supported (block 420), and means for performing handoff of the terminal jointly for the forward and reverse links if disjoint links are not supported (block 422).

Figure 5:
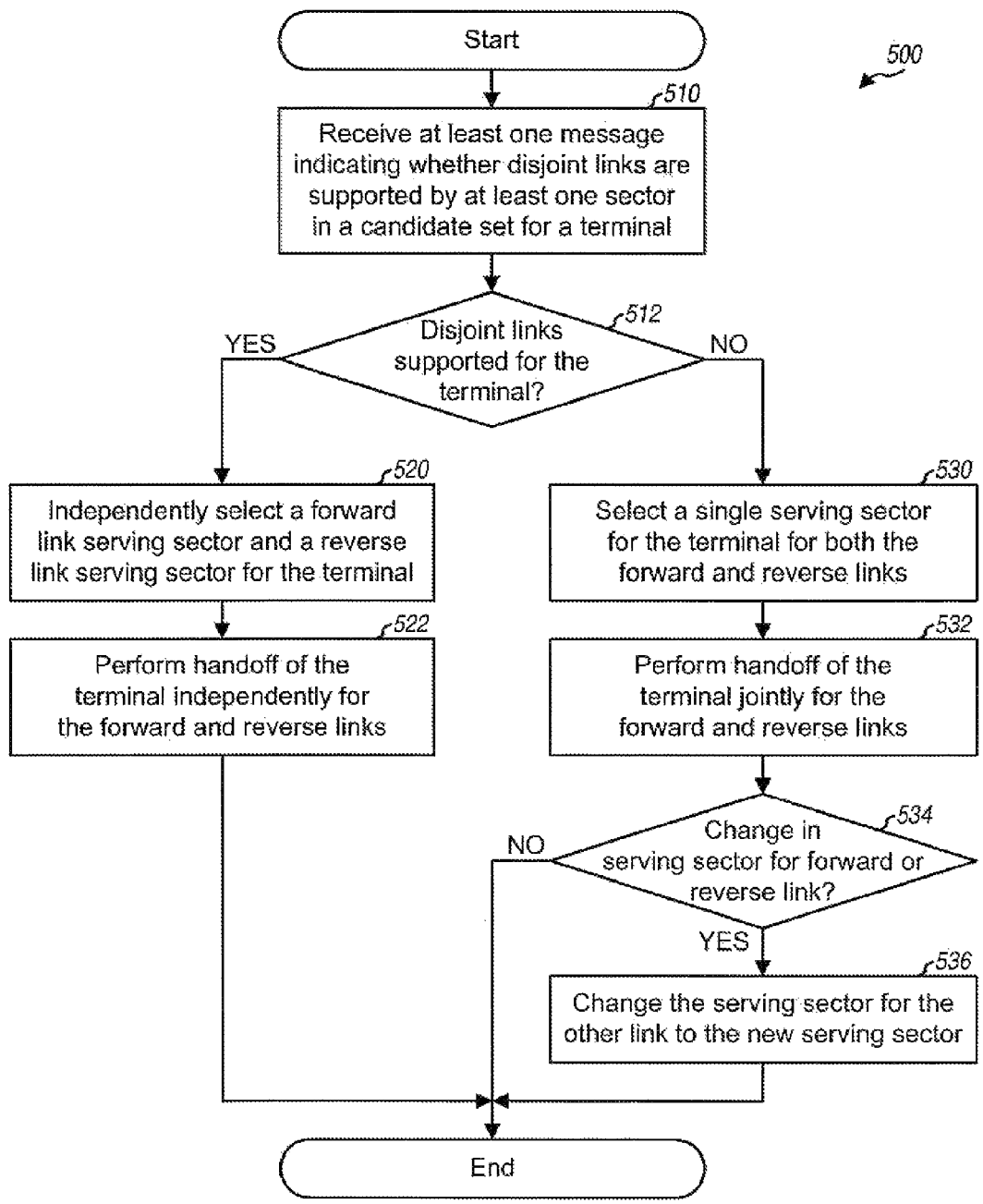
FIG. 5 shows a process for supporting communication for a terminal.

FIG. 5 shows a process 500 for supporting communication for a terminal. Process 500 may be performed by the terminal or a network entity designated to coordinate communication and/or handoff for the terminal. Initially, at least one message indicating whether disjoint links are supported, e.g., by at least one sector in an active set for the terminal, is received (block 510). If process 500 is performed by the terminal, then the terminal may receive (a) a mode bit broadcast by each sector in the active set or (b) one or more unicast messages (e.g., an active set update message) indicating the mode supported by each sector in the active set. If process 500 is performed by the designated network entity, then this network entity may obtain the at least one message from the sectors in the active set via backhaul communication. In any case, a determination is made whether disjoint links are supported for the terminal, e.g., based on the at least one message received in block 510, the capability of the terminal to support disjoint links, and/or other factors (block 512). This may be know based upon the terminal, and the determination is simply generating information indicative of the mode supported.

If the answer is 'Yes' for block 512 and disjoint links are supported, then a forward link serving sector and a reverse link serving sector may be independently selected for the terminal (block 520). Handoff of the terminal may be performed independently for the forward and reverse links (block 522). Otherwise, if the answer is 'No' for block 512 and disjoint links are not supported, then a single serving sector is selected for the terminal for both the forward and reverse links (block 530). Handoff of the terminal is performed jointly for the forward and reverse links (block 532). A determination is made whether there is a change in serving sector for either the forward or reverse link (block 534). If the answer is 'Yes', then the serving sector for the other link is also changed to the new serving sector (block 536).

As shown in FIG. 5, when disjoint links are not supported, a change in the forward link serving sector automatically implies a change in the reverse link serving sector, and vice versa. This logic may be applied to any change in serving sector, e.g., a serving sector change resulting from a handoff request sent by the terminal, from a handoff decision made by the system, etc.

Figure 6:
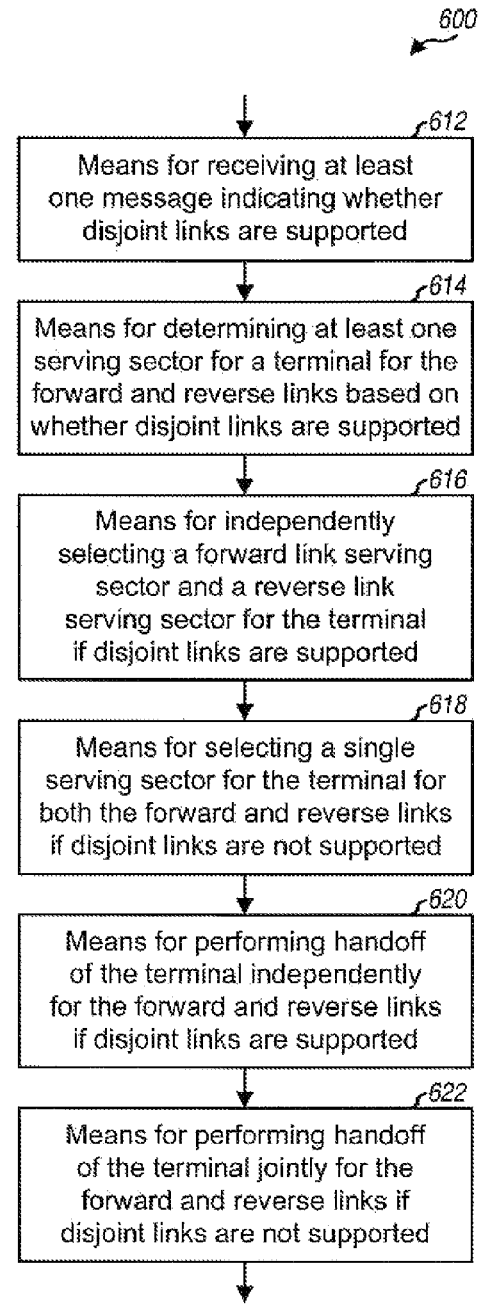
FIG. 6 shows an apparatus for supporting communication for a terminal.

FIG. 6 shows an apparatus 600 for supporting communication for a terminal. Apparatus 600 includes means for receiving at least one message indicating whether disjoint links are supported (block 612), means for determining at least one serving sector for a terminal for the forward and reverse links based on whether disjoint links are supported (block 614), means for independently selecting a forward link serving sector and a reverse link serving sector for the terminal if disjoint links are supported (block 616), means for selecting a single serving sector for the terminal for both the forward and reverse links if disjoint links are not supported (block 618), means for performing handoff of the terminal independently for the forward and reverse links if disjoint links are supported (block 620), and means for performing handoff of the terminal jointly for the forward and reverse links if disjoint links are not supported (block 622).

Figure 7:
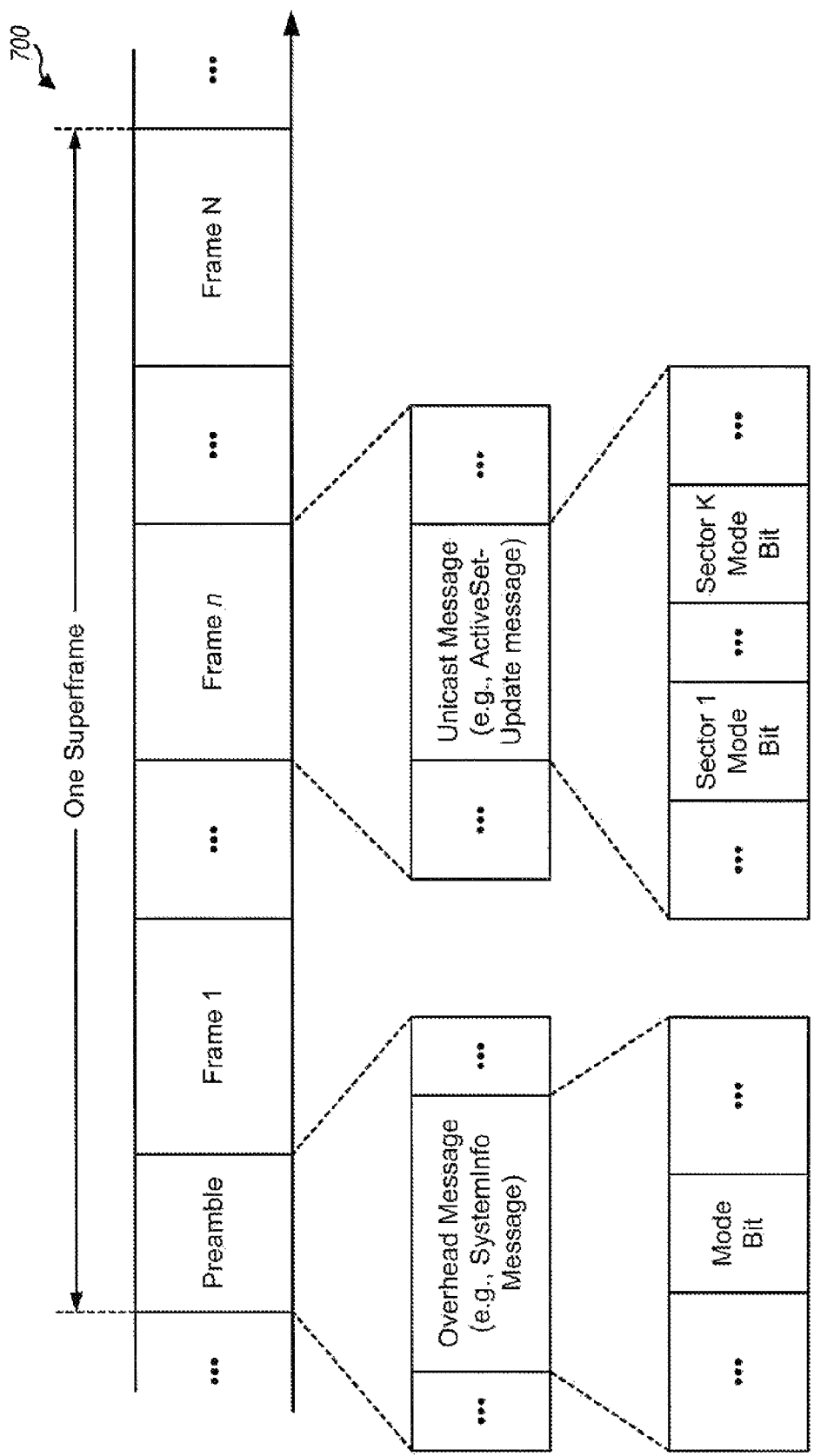
FIG. 7 shows an example superframe structure.

FIG. 7 shows an example superframe structure 700 that may be used for system 100. The transmission timeline may be partitioned into superframes. Each superframe may span a particular time duration, which may be fixed or configurable. Each superframe may include a preamble followed by N frames, where $N \geq 1$. The superframe preamble may carry overhead information that enables the terminals to receive forward link control channels and to access the system. An overhead message (e.g., a SystemInfo message, a QuickChannelInfo message, etc.) may be sent in the superframe preamble and may include a mode bit that may be set as described above. Each frame after the preamble may carry traffic data and/or messages. An overhead message (e.g., an ExtendedChannelInfo message, etc.) containing the mode bit may also be sent in similar manner as traffic data but with a broadcast MACID (not shown in FIG. 7). A unicast message (e.g., an ActiveSetUpdate message) may be sent to a specific terminal and may include, e.g., one mode bit for each sector in the active set (as shown in FIG. 7) or one mode bit for all sectors in the active set (not shown in FIG. 7). A sector may also convey whether disjoint links are supported in other manners using other messages.

Figure 8:
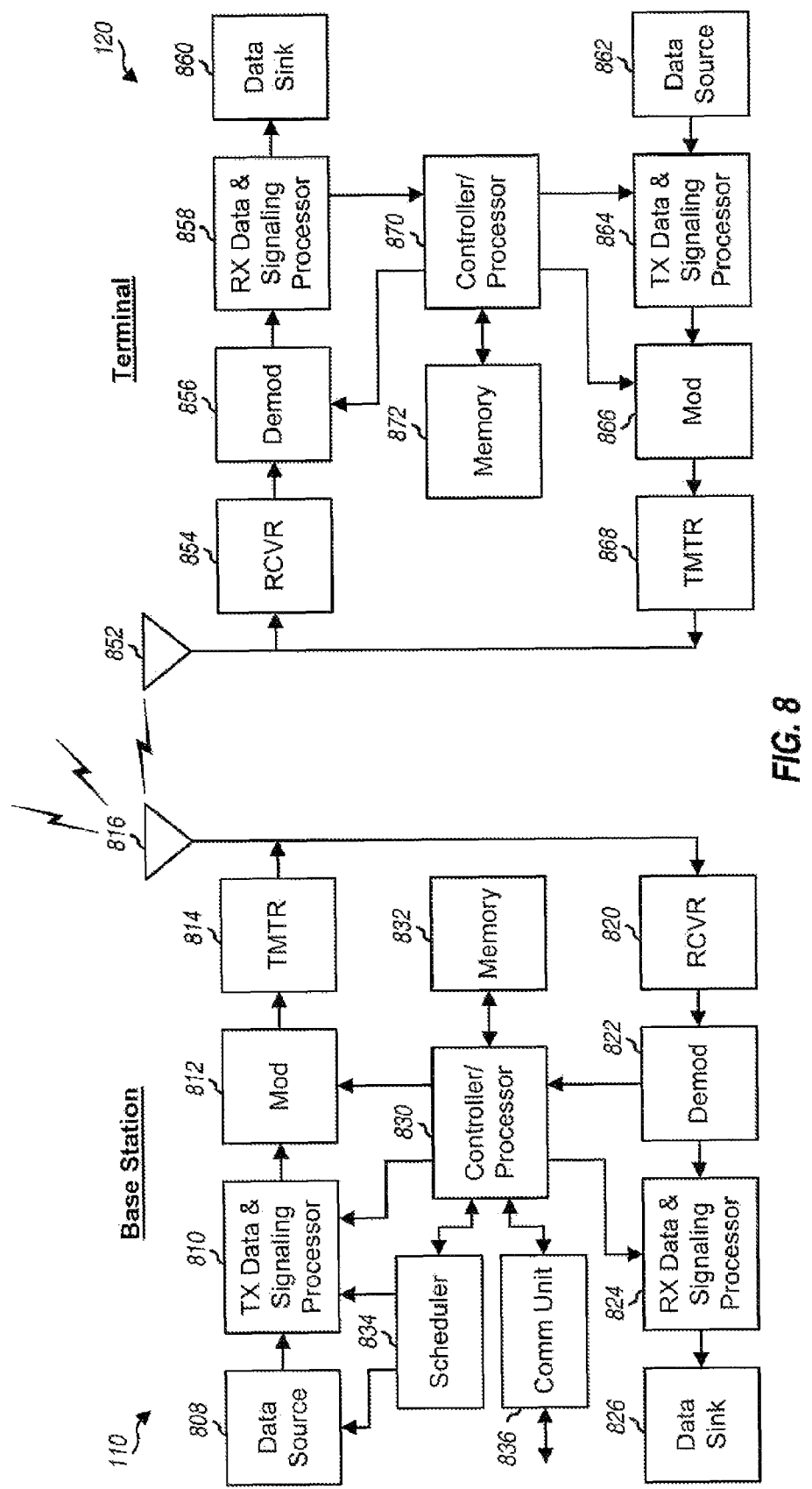
FIG. 8 shows a block diagram of a base station and a terminal.

FIG. 8 shows a block diagram of a design of a base station 110 and a terminal 120 in FIG. 1. In this design, base station 110 and terminal 120 are each equipped with a single antenna.

For forward link transmission, at base station 110, a transmit (TX) data and signaling processor 810 receives traffic data for one or more terminals from a data source 808, processes (e.g., formats, encodes, interleaves, and symbol maps) the traffic data for each terminal, and provides data symbols. Processor 810 also receives signaling (e.g., a mode bit or unicast messages indicating whether disjoint links are supported, handoff commands, etc.) and generates signaling symbols. A modulator (Mod) 812 performs modulation (e.g., for OFDM, SC-FDM, CDMA, etc.) on the data symbols, signaling symbols, and pilot symbols and provides output chips. A transmitter (TMTR) 814 conditions (e.g., converts to analog, filters, amplifies, and upconverts) the output chips and generates a forward link signal, which is transmitted via an antenna 816.

At terminal 120, an antenna 852 receives forward link signals from base station 110 and possibly other base stations. A receiver (RCVR) 854 processes (e.g., amplifies, downconverts, filters, and digitizes) the received signal from antenna 852 and provides received samples. A demodulator (Demod) 856 performs demodulation (e.g., for OFDM, SC-FDM, CDMA, etc.) on the received samples and provides symbol estimates. A receive (RX) data and signaling processor 858 processes (e.g., symbol demaps, deinterleaves, and decodes) the symbol estimates and provides decoded data for terminal 120 to a data sink 860 and recovered signaling to a controller/processor 870.

For reverse link transmission, at terminal 120, a TX data and signaling processor 864 generates data symbols for traffic data from a data source 862 and generates signaling symbols for signaling (e.g., handoff requests) to be sent to base station 110. A modulator 866 performs modulation on the data symbols, signaling symbols, and pilot symbols and provides output chips. A transmitter 868 conditions the output chips and generates a reverse link signal, which is transmitted via antenna 852.

At base station 110, reverse link signals from terminal 120 and other terminals are received by antenna 816, conditioned and digitized by a receiver 820, demodulated by a demodulator 822, and processed by an RX data and signaling processor 824 to recover traffic data and signaling sent by terminal 120 and other terminals.

Controllers/processors 830 and 870 direct the operation of various processing units at base station 110 and terminal 120, respectively. Controller/processor 830 may implement process 300 in FIG. 3 and/or other processes for the techniques described herein. Controller/processor 870 may implement process 500 in FIG. 5 and/or other processes for the techniques described herein. Memories 832 and 872 store program codes and data for base station 110 and terminal 120, respectively. A communication (Comm) unit 836 allows base station 110 to communicate with system controller 130 and/or other network entities via a backhaul, e.g., to exchange user information, scheduling information, mode bits, etc. A scheduler 834 receives signaling from the terminals and/or signaling from other base stations via communication unit 836. Scheduler 834 schedules the terminals being served by base station 110 for transmission on the forward and reverse links.

The techniques described herein may be implemented by various means. For example, the techniques may be implemented in hardware, firmware, software, or a combination thereof For a hardware implementation, the processing units used to perform the techniques at a terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof The processing units used to perform the techniques at a base station (e.g., a sector) or a network entity may also be implemented within one or more ASICs, DSPs, processors, etc.

For a firmware and/or software implementation, the techniques may be implemented with code (e.g., procedures, functions, and so on) that perform the functions described herein. The firmware and/or software codes may be stored in a computer readable medium, that is part of a computer program product, e.g. memory (e.g., memory 832 or 872 in FIG. 8) and executed by one or more processor (e.g., processor 830 or 870). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
a processor configured to:
   generate information indicative of whether a sector supports disjoint links for communication;
   send a message to a terminal indicating whether disjoint links are supported by the sector;
   receive from the terminal a selection of at least one of a forward link or a reverse link based on the message indicating whether disjoint links are supported by the sector;
   instruct serving the terminal for only the forward link or only the reverse link if disjoint links are supported by the sector; and
   instruct serving the terminal for both the forward and reverse links if disjoint links are not supported by the sector; and
a memory coupled to the processor;
wherein the processor is configured to instruct performing handoff of the terminal independently for the forward and reverse links if disjoint links are supported; and
wherein the processor is configured to instruct performing handoff of the terminal jointly for the forward and reverse links if disjoint links are not supported.

2. The apparatus of claim 1, wherein the message is a bit sent on an overhead channel.

3. The apparatus of claim 1, wherein the message is a unicast message sent to the terminal.

4. A method, comprising:
determining whether a sector supports disjoint links for communication;
sending a message to a terminal indicating whether disjoint links are supported by the sector;
receiving from the terminal a selection of at least one of a forward link or a reverse link based on the message indicating whether disjoint links are supported by the sector;
serving the terminal for only the forward link or only the reverse link if disjoint links are supported by the sector;
serving the terminal for both the forward and reverse links if disjoint links are not supported by the sector;
performing handoff of the terminal independently for the forward and reverse links if disjoint links are supported; and
performing handoff of the terminal jointly for the forward and reverse links if disjoint links are not supported.

5. The method of claim 4, wherein the sending the message comprises sending on an overhead channel a bit indicating whether disjoint links are supported by the sector.

6. An apparatus, comprising:
means for determining whether a sector supports disjoint links for communication;
means for sending a message to a terminal indicating whether disjoint links are supported by the sector;
means for receiving from the terminal a selection of at least one of a forward link or a reverse link based on the message indicating whether disjoint links are supported by the sector;
means for serving the terminal for only the forward link or only the reverse link if disjoint links are supported by the sector;
means for serving the terminal for both the forward and reverse links if disjoint links are not supported by the sector;
means for performing handoff of the terminal independently for the forward and reverse links if disjoint links are supported; and
means for performing handoff of the terminal jointly for the forward and reverse links if disjoint links are not supported.

7. The apparatus of claim 6, wherein the means for sending the message comprises means for sending on an overhead channel a bit indicating whether disjoint links are supported by the sector.

8. A computer program product, comprising:
a non-transitory computer-readable medium including code stored thereon, comprising:
code for determining whether a sector supports disjoint links for communication;
code for sending a message to a terminal indicating whether disjoint links are supported by the sector;
code for receiving from the terminal a selection of at least one of a forward link or a reverse link based on the message indicating whether disjoint links are supported by the sector;
code for serving the terminal for only the forward link or only the reverse link if disjoint links are supported by the sector;
code for serving the terminal for both the forward and reverse links if disjoint links are not supported by the sector;
code for performing handoff of the terminal independently for the forward and reverse links if disjoint links are supported; and
code for performing handoff of the terminal jointly for the forward and reverse links if disjoint links are not supported.

9. The apparatus of claim 1, wherein the processor is configured to perform handoff of the terminal to a sector based on whether the sector supports disjoint links.

10. The method of claim 4, further comprising performing a handoff of the terminal to a sector based on whether the sector supports disjoint links.

11. The apparatus of claim 6, further comprising means for performing a handoff of the terminal to a sector based on whether the sector supports disjoint links.

12. The computer program product of claim 8, wherein the computer-readable medium comprises code for performing a handoff of the terminal to a sector based on whether the sector supports disjoint links.

* * * * *